(12) United States Patent
Suntken

(10) Patent No.: US 7,348,561 B2
(45) Date of Patent: Mar. 25, 2008

(54) SENSING DEVICE FOR SENSING A PHYSICAL PARAMETER

(75) Inventor: Artur Wilhelm Suntken, Tierpoort (ZA)

(73) Assignee: Microsystems on Silicon (Pty) Ltd., Lynwood Ridge (ZA)

( * ) Notice: Subject to any disclaimer, the term of this patent is extended or adjusted under 35 U.S.C. 154(b) by 7 days.

(21) Appl. No.: 10/552,129

(22) PCT Filed: Apr. 6, 2004

(86) PCT No.: PCT/EP2004/003666

§ 371 (c)(1), (2), (4) Date: Aug. 31, 2006

(87) PCT Pub. No.: WO2004/090570

PCT Pub. Date: Oct. 21, 2004

(65) Prior Publication Data

US 2007/0035314 A1 Feb. 15, 2007

(30) Foreign Application Priority Data

Apr. 7, 2003 (ZA) ................................. 03/2684

(51) Int. Cl.
*G01J 5/00* (2006.01)

(52) U.S. Cl. ................................. 250/338.1

(58) Field of Classification Search ............ 250/338.1, 250/342, 352
See application file for complete search history.

(56) References Cited

U.S. PATENT DOCUMENTS

| | | | |
|---|---|---|---|
| 4,465,379 A | 8/1984 | Misawa et al. | |
| 4,827,133 A | 5/1989 | Zierhut | |
| 5,461,425 A | 10/1995 | Fowler et al. | |
| 5,764,146 A * | 6/1998 | Baldwin et al. | ............ 340/567 |
| 5,811,808 A | 9/1998 | Cannata et al. | |

OTHER PUBLICATIONS

H. Kogure et al., "Analysis of CMOS ADC Nonliner Input Capacitance," IEICE Trans. Electron., vol. E85-C, No. 5, May 2002, pp. 1182-1190.

"Theory of Operation Multi-Bit Enhanced Noise Shaping," Burr-Brown Integrated Circuits Data Book—Data Conversion Products, XP-002303870, p. 2.341, 1994.

* cited by examiner

*Primary Examiner*—David Porta
*Assistant Examiner*—Mark R Gaworecki
(74) *Attorney, Agent, or Firm*—Shumaker & Sieffert, P.A

(57) ABSTRACT

The sensing device for sensing a physical parameter such as radiation, temperature or the like, comprises an analogue sensor element sensitive for the physical parameter to be sensed and outputting an analogue signal and an analogue two-digital converter (ADC) having an MOS input stage for receiving the analogue output signal of the sensor element so as to convert the analogue output signal to a digital output signal.

10 Claims, 4 Drawing Sheets

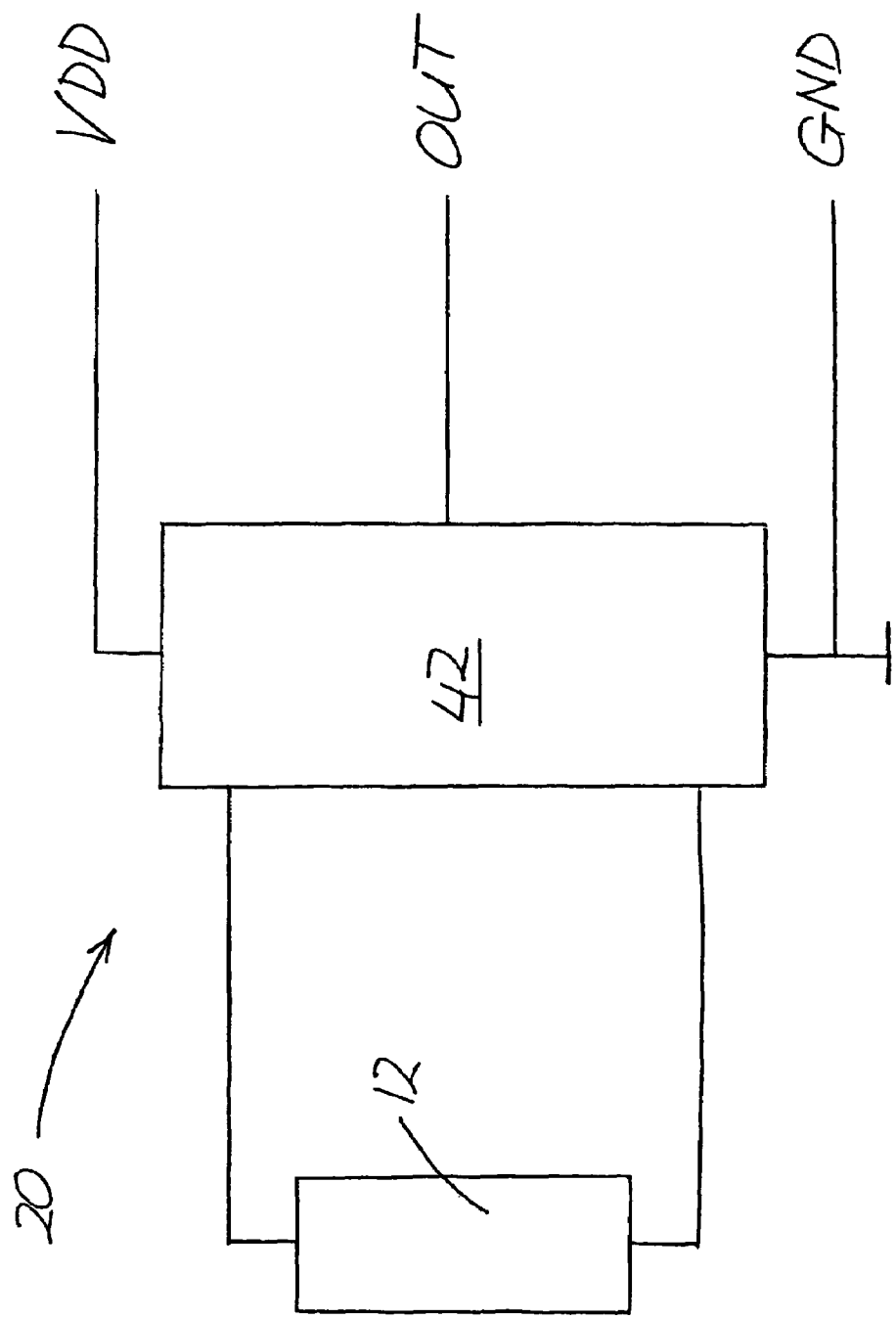

SENSING DEVICE FOR SENSING A PHYSICAL PARAMETER

FIELD OF THE INVENTION

The present invention relates to a sensing device for sensing a physical parameter such as radiation, temperature or the like, and, in particular, to a digital passive infra-red (PIR) sensor.

BACKGROUND OF THE INVENTION

Passive infra-red (PIR) sensors are typically, but not exclusively, used to detect the presence of humans in a particular zone. PIR sensors find ready application in the fields of sensor lights, intruder detectors, and occupation detectors (used, for example, to switch and/or regulate lighting and/or air-conditioning systems in hotels, offices, and the like so as to conserve energy).

The Inventor is aware of conventional PIR sensors which typically include a conventional analogue PIR element connected, via a capacitive node having a high impedance, to an impedance converter for converting the high impedance to a relatively low impedance on the output of the sensor without amplification. Accordingly, an analogue signal is available at the output of the conventional PIR sensor.

SUMMARY OF THE INVENTION

According to the invention there is provided a sensing device for sensing a physical parameter such as radiation, temperature or the like, comprising an analogue sensor element sensitive for the physical parameter to be sensed and outputting an analogue signal and an analogue two-digital converter (ADC) having a MOS input stage for receiving the analogue output signal of the sensor element so as to convert the analogue output signal to a digital output signal.

Typically, the ADC has a differential input to which the output terminals of the analogue sensor element are connected.

Preferably, the output of the ADC is connected to a digital feedback logic in turn connected to a digital-two-analogue converter (DAC) the output signal of which is added to the output signal of the analogue sensor element.

More preferably, the ADC is a sigma-delta-converter comprising an integrator and a comparator connected in series to each other. The sigma-delta-converter typically is a first order converter. However, sigma-delta-converters of higher orders can also be used.

According to a further aspect of the invention, the sensing device further comprises a decimation filter receiving the output signal of the ADC.

In another preferred embodiment, the sensing device further comprises a compensation temperature sensor for sensing the ambient temperature.

According to an additional aspect of the invention, the sensing device further comprises a lens for selecting the direction from which radiation can be received by the analogue sensor element so as to be sensed.

In particular, the analogue element is a passive element and, in particular, an infra-red sensor element. Such an infra-red sensor element comprises a capacitor the capacitance of which varies depending on the infra-red radiation impinging on the capacitor.

Finally, according to another aspect of the invention, the sensor device further comprises a single line output providing the digital output signal for transmitting to a signal processing unit like e.g. a microcontroller or the like.

The ADC of the sensing device according to the invention may include an input amplifier.

The ADC may include an input means configured to interface with the sensor element.

The sensing device may include a decimation filter connected to an output of the ADC for filtering out unwanted high frequency components of the output of the ADC and providing a high resolution output.

The sensing device furthermore may include a serial interface for converting a parallel output of the decimation filter to a serial output. This allows the output of the digital sensor to be available on a single pin.

The sensing device typically includes control means for controlling the operation of the ADC, the decimation filter, and the serial interface.

The ADC, the decimation filter, the serial interface, and/or the control means are typically provided as an integrated circuit (IC).

The sensing device is typically housed within a housing so that it can be used for direct connection to an external processor in a system incorporating the digital sensor.

The sensing device according to the invention allows for a capacitive PIR sensor to be directly connected to an IC-chip provided signal processing means. The analogue signal from the sensor element (in particular from the PIR sensor element) is converted to a digital signal with the use of the ADC which in particular is formed as an integrated sigma-delta-converter. The output signal of the ADC typically is converted to a multi-bit signal with a data rate of typically around 1 kHz. Preferably in such a case, the filter characteristic of the digital filter logic matches a low pass filter (typically a second order Butterworth low pass filter with a cut-off frequency of a few Hz and typically of around 7 Hz).

The signal is capable of being transmitted via a single line output to the serial interface of the externally connected signal processing means which for example is a micro controller.

By means of the specific feedback control of the sensing device according to the invention it is possible to suppress the high offsets inherent with analogue passive sensor elements such as PIR sensor elements. These offsets and charges of and in the sensor element provides the major part of the output signal. Accordingly, the noise to signal ratio is disadvantageous. By the invention it is possible to extract also very small parts of the output signal which include the sensed information of the physical parameter.

The ADC front-end has a differential input designed to interface to the sensor element. This input represents a summing knot from the internal ADC converter feedback (analogue signal) and the signal from the sensor element. In case of a PIR-element, the sensor behaves like a piezo element and has a capacitance of approximately 20 pF to 60 pF. The internal feedback is also capacitive. The summing knot is connected to an integrator which preferably is a part of the ADC converter as in case of a sigma-delta-converter. Therefore, the input of the integrator must be kept at an average of zero by the feedback circuit. The output of the integrator is followed by a comparator and a digital logic circuit, which generates a multi-bit digital feedback signal. This digital signal is converted back to analogue and used to compensate (neutralise) the analogue sensor output signal. By means of the digital feedback logic it is possible to achieve an overall stability of the sigma-delta-converter configuration.

BRIEF DESCRIPTION OF THE DRAWINGS

Some of the above indicated and other more detailed aspects of the invention will be described in the following description and partially illustrated with reference to the drawings. As used herein, like numerals throughout the various Figures represent the same or equivalent features of the present invention. Therein:

FIG. 4 shows, schematically, a PIR element connected to an integrated circuit (IC) including the rest of the features of the digital sensor.

DETAILED DESCRIPTION OF A PREFERRED EMBODIMENT OF THE INVENTION

Figure 1:
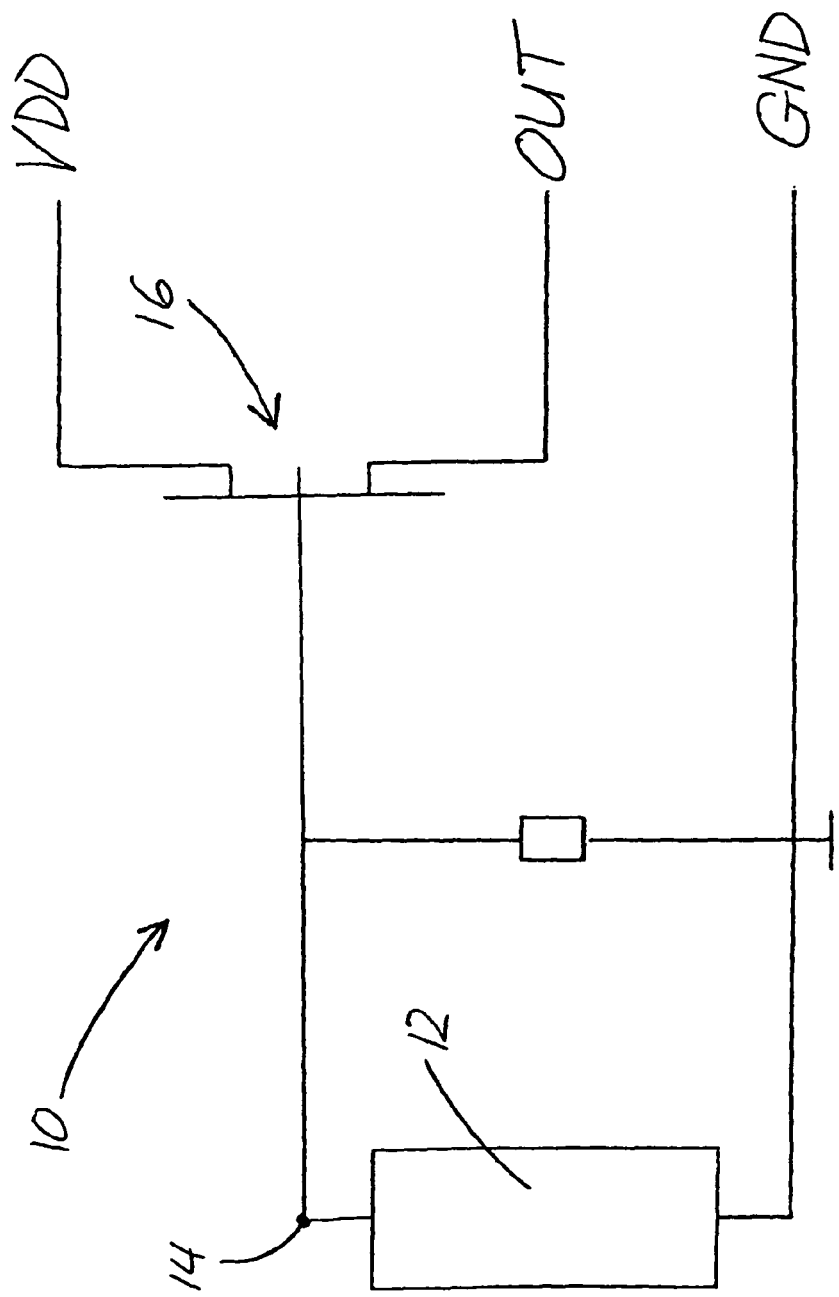
FIG. 1 shows, schematically, a block diagram of a conventional analogue passive infra-red (PIR) sensor.

In FIG. 1 reference numeral 10 generally indicates a conventional analogue passive infra-red (PIR) sensor. The conventional sensor 10 includes a conventional analogue PIR element 12 connected, via a capacitive node 14 having a high impedance, to an impedance converter 16 for converting the high impedance to a relatively low impedance on the output of the conventional sensor 10 without amplification. Accordingly, an analogue signal is available at the output of the conventional sensor 10.

Figure 2:
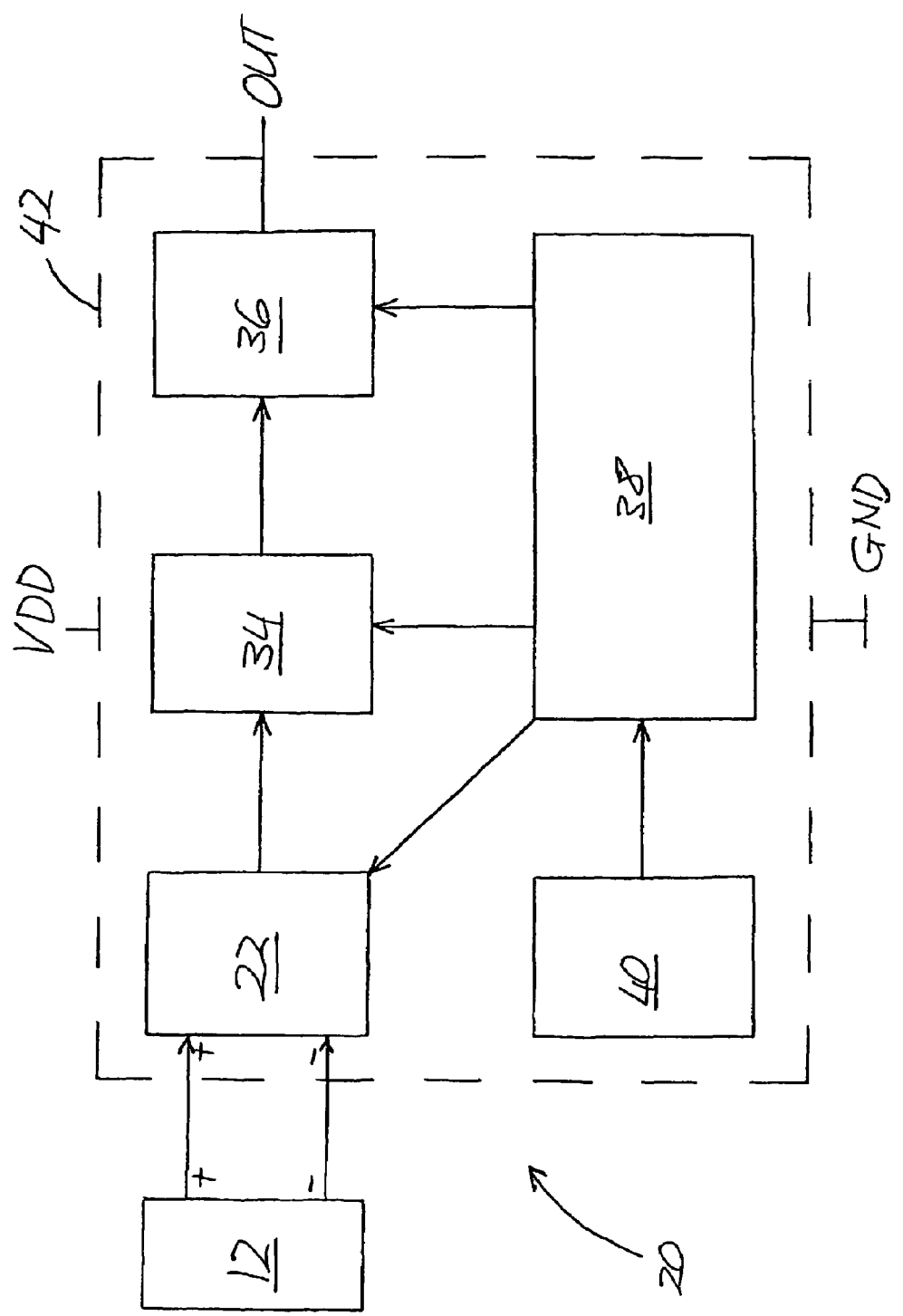
FIG. 2 shows, schematically, a block diagram of a digital sensor, in accordance with the invention.

In FIGS. 2 and 4 reference numeral 20 generally indicates a digital sensor in accordance with the invention. The digital sensor 20 includes a conventional analogue passive infra-red (PIR) element 12 and an analogue to digital converter (ADC) 22 connected to the output of the analogue PIR element 12 so as to provide a digital output. The ADC 22 typically also includes an input amplifier.

Figure 3:
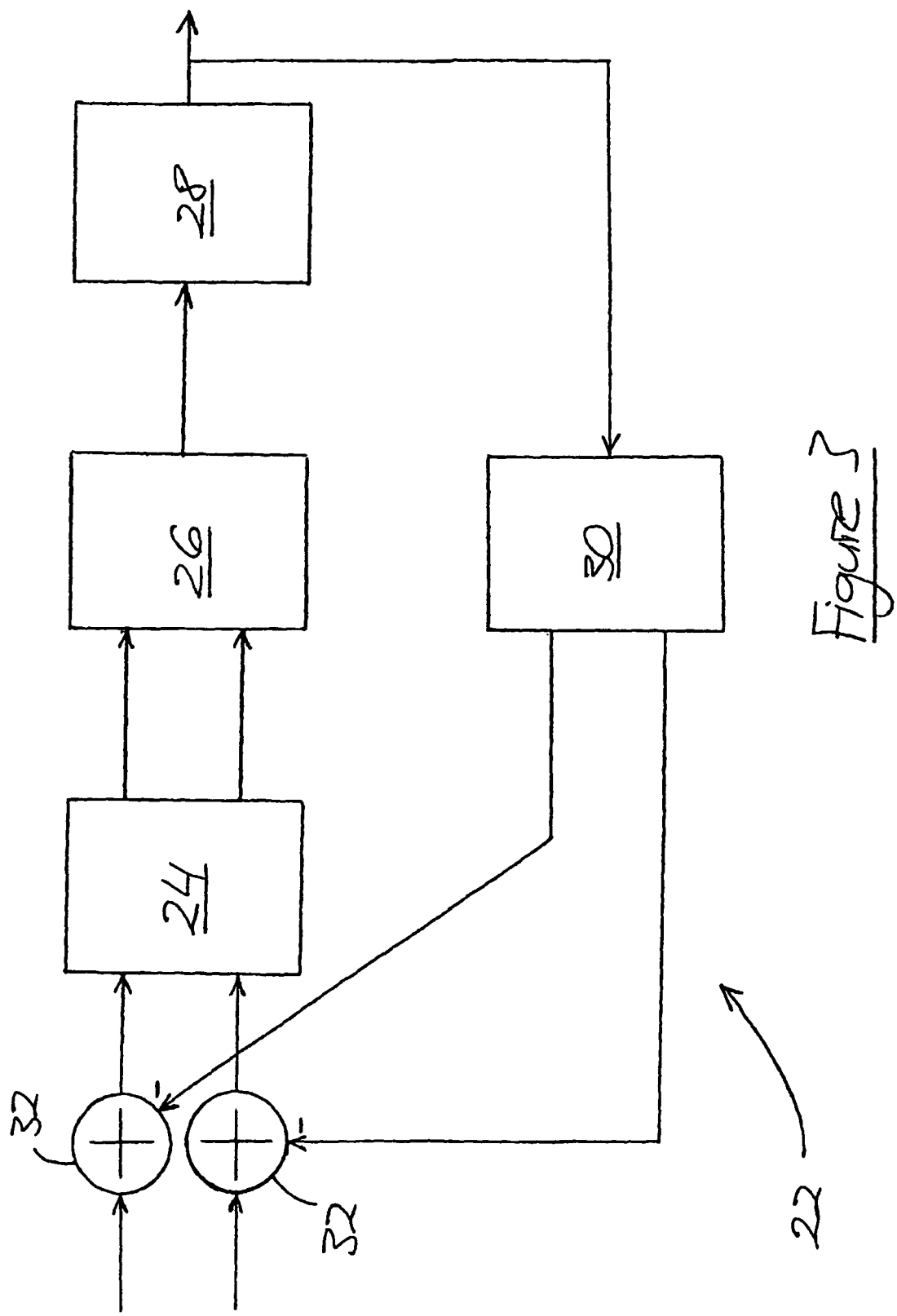
FIG. 3 shows, schematically, a more detailed block diagram of the analogue to digital converter (ADC) shown in FIG. 2.

As shown in FIG. 3, in particular, the ADC 22 includes an input means configured to interface with the PIR element 12. Accordingly, the ADC 22 includes an integrator 24 which feeds in series into a comparator 26 which in turn feeds in series into a digital feedback means 28. The output of the digital feedback means 28 is fed back via a digital to analogue converter (DAC) 30 and the appropriate interfacing circuitry (not shown) into a summing node 32 together with the output of the PIR element 12. In this example, the PIR element 12 behaves like a piezo element and typically has a capacitance of approximately 20 pF to 60 pF. The output of the DAC 30 is also capacitive. The output of the summing node 32 is fed into the integrator 24 to complete the circuit.

In use, the ADC 22 operates by attempting to maintain the input of the integrator 24 at an average of zero by the digital feedback means 28 via the DAC 30 so as to compensate (neutralise) the output of the PIR element 12. The digital feedback means employs a special algorithm to achieve overall stability of this configuration.

The digital output of the digital feedback means 28 (which is in fact the digital output of the ADC 22) is fed into a decimation filter 34 for filtering out unwanted high frequency components and providing a high resolution output. In this example, the decimation filter 34 generates a 16 bit digital signal with a sampling rate of approximately 1 kHz. The bandwidth of this signal is limited to frequencies below 20 Hz.

The amplitude value of the output of the decimation filter 34 is then fed into a serial interface 36 for conversion into a serial output. This allows the output of the digital sensor 20 to be available on a single pin. The serial interface 36 also operates as a data latch.

The digital sensor 20 typically includes control means 38 for controlling the operation of the ADC 22, the decimation filter 34, and the serial interface 36. An oscillator 40 is connected to the control means 38 to provide a clock. The ADC 22, the decimation filter 34, the serial interface 36, and the oscillator 40 are typically provided as an integrated circuit (IC) 42, as shown in particular in FIG. 4, and the entire digital sensor 20 is housed within a housing (not shown) so that it can be used for direct connection to an external processor (not shown) in a system incorporating the digital sensor 20 in a simple and user-friendly manner.

In this example, the serial interface 36 is in the form of a one bit serial interface which places very little load on the external processor and, accordingly, allows for multiple digital sensors 20 to be controlled by a single low speed external processor in a system. The external processor determines the frequency at which the data is read and, due to the low cut-off frequency and the order of the decimation filter, the external processor can read the data at rates as low as 100 Hz. A data bit is sampled after a 0-1—high impedance sequence generated by the external processor.

It is to be appreciated that the invention is not limited to the precise constructional details as described above and shown in the drawings as other variations incorporating the gist of the invention are possible and fall within the scope of the invention.

The Inventor believes that this invention has the advantage that an external digital signal processor of a system incorporating one or more digital sensors according to the invention can be connected directly to such digital sensor obviating the need to develop any analogue signal processing or any analogue to digital conversion.

Furthermore, the digital sensor does not require a very clean supply voltage VDD and is inherently protected against radio frequency (RF) disturbances. The additional cost of providing a digital sensor compared to that of a conventional analogue sensor is relatively small. Accordingly, multi-sensor applications are very cost effective.

Although the present invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the present invention also such variations and modifications as fall within the scope of the appendant claims and equivalents thereof.

The invention claimed is:

1. A sensing device for sensing a physical parameter, comprising:
    an analogue sensor element sensitive for the physical parameter to be sensed and outputting an analogue signal and
    an analogue-to-digital converter (ADC) having a MOS input stage for receiving the analogue output signal of the sensor element so as to convert the analogue output signal to a digital output signal,
    wherein the analogue sensor element is passive infra-red sensor element and wherein the ADC has a differential MOS input stage to which the output terminals of the passive infra-red sensor element are directly connected.

2. The sensing device according to claim 1, wherein the output of the ADC is connected to a digital feedback logic in turn connected to a digital-to-analogue converter (DAC) the output signal of which is added to the output signal of the analogue sensor element.

3. The sensing device according to claim 1, wherein the ADC is a sigma-delta-converter comprising an integrator and a comparator connected in series to each other.

4. The sensing device according to claim 1, further comprising a decimation filter receiving the output signal of the ADC.

5. The sensing device according to claim 1, further comprising a compensation temperature sensor for sensing ambient temperature.

6. The sensing device according to claim 1, further comprising a lens for selecting a direction from which radiation can be received by the analogue sensor element so as to be sensed.

7. The sensor device according to claim 1, further comprising a single line output providing the digital output signal for transmitting to a signal processing unit.

8. The sensing device of claim 7, wherein the signal processing unit comprises a microcontroller.

9. The sensing device of claim 1, wherein the physical parameter comprises radiation.

10. The sensing device of claim 1, wherein the physical parameter comprises temperature.

* * * * *